United States Patent [19]

Shimizu

[11] Patent Number: 4,872,093
[45] Date of Patent: Oct. 3, 1989

[54] BRIGHT METER
[75] Inventor: Takeshige Shimizu, Shimada, Japan
[73] Assignee: Yazaki Corporation, Japan
[21] Appl. No.: 199,709
[22] Filed: May 27, 1988
[30] Foreign Application Priority Data May 29, 1987 [JP] Japan ............................ 62-081014[U]

[51] Int. Cl.⁴ ............................................ G01D 11/28
[52] U.S. Cl. ...................................... 362/26; 362/30;
116/288; 116/DIG. 6; 177/177
[58] Field of Search ...................... 362/23, 26, 29, 30,
362/28, 31, 32; 116/288, 328, DIG. 6

[56] References Cited
U.S. PATENT DOCUMENTS

| | | | |
|---|---|---|---|
| 2,831,453 | 4/1958 | Hardesty | 116/288 |
| 2,902,970 | 9/1959 | Kadlec | 362/29 X |
| 4,163,428 | 8/1979 | Ishikawa | 362/29 X |
| 4,218,726 | 8/1980 | Fukasawa et al. | 362/32 X |
| 4,258,643 | 3/1981 | Ishikawa et al. | 362/26 X |
| 4,274,358 | 6/1981 | Nakamura et al. | 362/28 X |
| 4,300,470 | 11/1981 | Furukawa | 116/332 |
| 4,380,043 | 4/1983 | Takamatsu et al. | 362/26 |
| 4,625,262 | 11/1986 | Sakakibau et al. | 362/30 X |

Primary Examiner—Ira S. Lazarus
Assistant Examiner—Peggy Neil
Attorney, Agent, or Firm—Wigman & Cohen

[57] ABSTRACT

To improve bright needle recognizability on a dial for a bright meter, a needle made of a light transmissible material and brightened by a light source comprises a lower light reflecting layer formed at a lower surface of the needle; a first side light reflecting layer formed on a first side surface of the needle; and an upper semitransparent layer for brightening an upper surface of the needle. Therefore, when the needle is brightened, light is transmitted from a second side surface opposing the first side surface of the needle obliquely onto the dial to illuminate the lower indication display area side from the needle on the dial, for instance.

7 Claims, 2 Drawing Sheets

BRIGHT METER

BACKGROUND OF THE INVENTION

1. Field of the Invention

The present invention relates generally to a bright meter and more specifically to a needle brightened on a dial of a bright meter suitable for use in speed meters, tachometers, etc. arranged in a dashboard of an automotive vehicle, for instance.

2. Description of the Prior Art

In some automotive vehicles, bright meters whose dial and needle are brightened by light are arranged in a dashboard of the vehicle. FIGS. 1A to 1C show a dial and a needle of a prior-art bright speed meter, by way of example.

In these drawings, a dial 1 is made of a light transmissible (i.e. transparent) synthetic resin. The surface of the dial is printed by a semitransparent or an opaque colored paint, and dial numerals, characters, graduations, etc. are formed by removing the paint on the dial 1 into the shapes corresponding thereto. A light guide plate 3 is so disposed under the dial 1 as to introduce light emitted from a light source 2 to a needle axle 5 as a background illumination light, so that the whole surface of the dial 1 or the numerals and the graduations can be illuminated from under by the light source 2 and through the light guide plate 3.

A needle 4 arranged at the center of the dial 1 is made of the same light transmissible material as that of the dial 1 and the light guide plate 3. The needle 4 is fixed to a needle axle 5 rotatable according to the magnitude of vehicle speed, so that one end of the needle 4 rotates on the dial 1.

The light guided through the light guide plate 3 as shown in FIG. 1B is reflected upward from a central inner conical reflecting surface 3a, being introduced into the central portion of the needle 4, and then reflected again radially outward from a reflecting surface 4b formed at the needle axle 4a to a free end of the needle 4. Further, in FIG. 1B, the numeral 4C denotes a metallic needle cap.

On the other hand, as shown in FIG. 1C, a reflecting layer 4d (e.g. orange-colored) is formed by printing on the lower needle surface along the needle longitudinal direction, so that part of the light introduced into the needle is reflected upward.

In the above-mentioned prior-art bright meter, however, there still exists a problem in that the needle recognizability is not satisfactory according to the surrounding illumination conditions or driver's eye position, because the illumination area of the bright needle 4 is not broad enough for the driver.

SUMMARY OF THE INVENTION

With these problems in mind, therefore, it is the primary object of the present invention to provide a bright meter of excellent needle recognizability.

To achieve the above-mentioned object, a bright meter according to the present invention comprises: (a) a light source; (b) a dial; and (c) a needle made of a light transmissible material and brightened by said light source, having: (1) a lower light reflecting layer formed on a lower surface of said needle; (2) a first side light reflecting layer formed on a first side surface of said needle, when said needle is brightened, light being reflected from said first side light reflecting layer and emitted through a second side surface opposing said first side surface of said needle obliquely onto said dial.

Further, it is preferable that the needle is further formed with an upper semitransparent layer for brightening the upper surface of the needle.

Therefore, when the needle is brightened, light is transmitted from a second side surface opposing the first side surface of the needle obliquely onto the dial to illuminate the lower indication display area side from the needle on the dial, for instance.

In the bright meter of the present invention, since the needle is brightened from the upper surface thereof and further the dial display area corresponding to the side surface of the needle can be illuminated in sector (tail) fashion, it is possible to indicate the needle and partial dial graduations (including a basic indication point, in some case), so that the indication recognizability can be improved.

BRIEF DESCRIPTION OF THE DRAWINGS

The features and advantages of the bright meter according to the present invention will be more clearly appreciated from the following description of the preferred embodiment of the invention taken in conjunction with the accompanying drawings in which.

DETAILED DESCRIPTION OF THE PREFERRED EMBODIMENTS

Figure 2A:
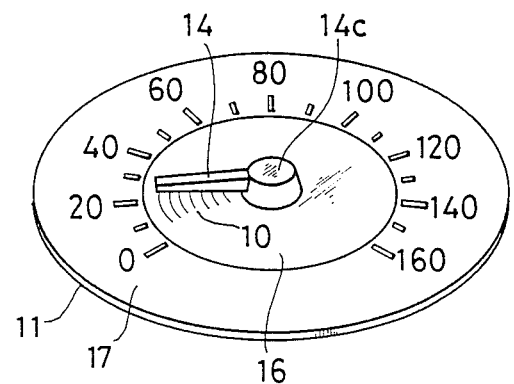
FIG. 2A is a cross-sectional view showing an embodiment of the bright meter of the present invention.
Figure 2B:
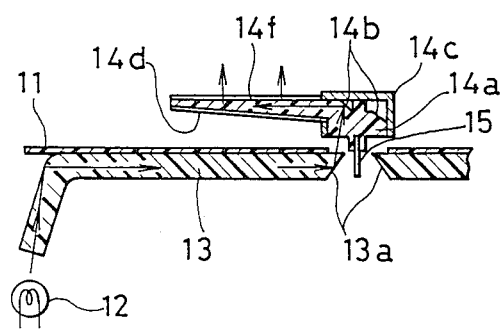
FIG. 2B is a cross-sectional view showing the illumination structure of the bright meter shown in FIG. 2A.
Figure 2C:
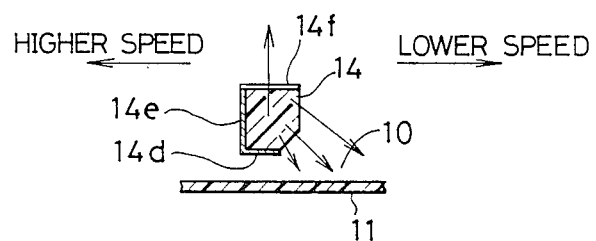
FIG. 2C is a cross-sectional view showing the needle structure of the bright meter shown in FIG. 2A.

FIGS. 2A, 2B and 2C show an embodiment (speed meter) of the bright meter of the present invention. A dial 11 is made of a light transmissible synthetic resin. A semitransparent or an opaque colored paint is applied onto the surface of the dial 11, and then removed into the shapes corresponding to numerals, characters, graduations, etc. In this meter dial 11, the central area 16 where a needle 14 is rotated is painted in hue with a relatively high color brightness (e.g. light blue), while the annular area 17 where numerals and graduations are formed is painted in hue with a relatively low color brightness (e.g. black mat).

Figure 1A:
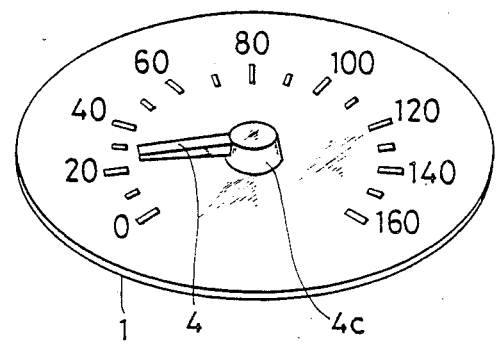
FIG. 1A is a perspective view showing a prior-art bright meter.
Figure 1B:
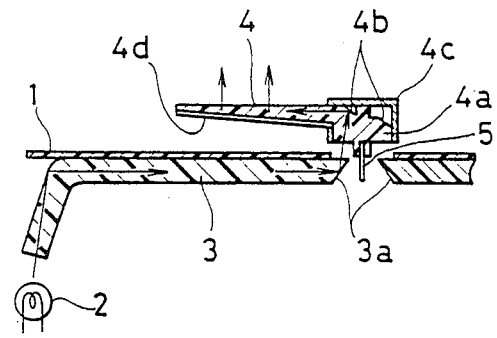
FIG. 1B is a cross-sectional view showing the illumination structure of the prior-art bright meter shown in FIG. 1A.
Figure 1C:
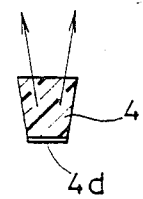
FIG. 1C is a cross-sectional view showing the needle structure of the prior-art bright meter shown in FIG. 1A.

A needle 14 is made of a transparent light transmissible material. Being different from the prior art needle 4 shown in FIG. 1C, however, the needle 14 is covered by a lower light reflecting layer 14d on the lower side surface, a side light reflecting layer 14e on one side surface (in FIG. 2C, the higher speed indication display area side), and a semitransparent layer 14f on the upper surface of the needle. In this embodiment, the two light reflecting layers 14d and 14e are an aluminum colored mirror surface formed by roll leaf hot stamping technique, and the semitransparent layer 14f is formed by applying an orange colored paint.

The light emitted from a light source 12 is guided through a light guide plate 13 to the center of the dial 11, being reflected upward from a central inner conical reflecting surface 13a to the central portion of the needle 14, and then reflected again radially outward from a reflecting surface 14b formed at the needle axle 14a to a free end of the needle 14. Further, in FIG. 2B, the numeral 14C denotes a metallic needle cap.

The light introduced into the needle 14 is partially emitted toward the outside through the upper semitransparent layer 14f to brighten the needle 14 itself. However, the light is also emitted obliquely onto a sector area 10 on the dial to illuminate the lower indication display area from the current needle position.

Therefore, the area corresponding to the higher indication display area is not illuminated but that corresponding to the lower indication display area is partially illuminated in the light tail fashion, in such a way that the brightness of the light tail is higher in the central area 16 than in the annular area 17 and decreases gradually with distance away from the needle 14 in the central area 16, thus improving the needle indication recognizability.

In the above embodiment, since the meter is a speed meter, the illumination tail emitted from the needle is formed on the lower indication display area side of the needle. Without being limited thereto, it is possible to form the illumination tail emitted from the needle on the higher indication display area side of the needle, according to the kinds of display or indication.

Further, in the above embodiment, the light reflecting layer is formed throughout the lower surface 14d and the side surface 14e of the needle 14. Without being limited thereto, however, it is possible to appropriately form the light reflecting layers at any positions on the needle side surface in any shapes so that single or plural illumination tails can be formed on the dial surface from the needle in order to improve the needle position recognizability.

As described above, in the bright meter of the present invention, since the needle is brightened from the upper surface thereof and further the dial display area corresponding to the side surface of the needle can be brightened in sector (tail) fashion, it is possible to more clearly indicate the needle and the partial dial graduations (including a basic indication point in some cases), thus improving the needle indication recognizability.

What is claimed is:

1. A bright meter comprising:
   (a) a light source;
   (b) a dial; and
   (c) a needle made of a light transmissible material and brightened by said light source, having:
      (1) a lower light reflecting layer formed on a lower surface of said needle;
      (2) a first side light reflecting layer formed on a first side surface of said needle, when said needle is brightened, light being reflected from said first side light reflecting layer and emitted through a second side surface opposing said first side surface of said needle obliquely onto said dial.

2. The bright meter as set forth in claim 1, wherein said needle further comprises an upper semitransparent layer for brightening an upper surface of said needle.

3. The bright meter as set forth in claim 1, wherein said second side surface of said needle through which illumination light is emitted onto the dial is located on a lower indication display area side on said dial.

4. The bright meter as set forth in claim 1, wherein said second side surface of said needle through which illumination light is emitted onto the dial is located on a higher indication display area side on said dial.

5. A bright meter comprising:
   (a) a light source;
   (b) a dial; and
   (c) a pointer needle made of a light transmissible material and brightened by said light source, having:
      (1) a lower light reflecting layer formed on a lower surface of said needle;
      (2) a first side light reflecting layer formed on a first side surface of said needle; and
      (3) an upper semitransparent layer for brightening an upper surface of said needle, when said needle is brightened, light being reflected from said first side light reflecting layer and partially reflected from said upper semitransparent layer, and further being emitted obliquely onto said dial through a second side surface opposing said first side surface of said needle.

6. The bright meter as set forth in claim 5, wherein said second side surface of said needle through which illumination light is emitted onto the dial is located on a lower indication display area side on said dial.

7. The bright meter as set forth in claim 5, wherein said second side surface of said needle through which illumination light is emitted onto the dial is located on a higher indication display area side on said dial.

* * * * *